(12) United States Patent
Burns et al.

(10) Patent No.: US 6,306,036 B1
(45) Date of Patent: Oct. 23, 2001

(54) COMPUTER GAME WITH REPLACEABLE CHARACTER HEADS

(75) Inventors: Patrick Burns, Edinburgh; Stewart Lindsay Clark, Dundee; Kirk Mitchell Ewing, Glasgow; Robert Graham, Fife; Malcolm Scott Maxwell, Edinburgh; Christiaan Richard David van der Kuyl, Dundee, all of (GB)

(73) Assignee: VIS Interactive, Fife (GB)

( * ) Notice: Subject to any disclaimer, the term of this patent is extended or adjusted under 35 U.S.C. 154(b) by 0 days.

(21) Appl. No.: 09/080,344

(22) Filed: May 18, 1998

(51) Int. Cl.$^7$ .................................................. A63F 9/22
(52) U.S. Cl. .............................................. 463/31; 463/32
(58) Field of Search ................. 463/1–9, 15, 30–32, 463/36; 700/91; 273/237, 236, 460, 461, 459

(56) References Cited

U.S. PATENT DOCUMENTS

| | | | |
|---|---|---|---|
| 4,738,451 | * | 4/1988 | Logg . |
| 5,190,285 | * | 3/1993 | Levy ..................................... 273/237 |
| 5,498,002 | | 3/1996 | Gechter . |
| 5,498,003 | | 3/1996 | Gechter . |
| 5,601,487 | * | 2/1997 | Oshima et al. .......................... 463/4 |
| 5,618,043 | | 4/1997 | McGlew . |
| 5,674,127 | | 10/1997 | Horstmann et al. . |
| 6,056,640 | * | 5/2000 | Schaaij ..................... 463/4 |

OTHER PUBLICATIONS

Gauntlet Game Rulebook by Mindscape, Inc., 6 pages, 1987.*
Computer Games Strategy Plus, Issue 82, Review of "Norse by Norsewest", p. 124, Sep. 1997.*
"Norse by Norsewest" Game Review by Joe Hutsko on the World Wideweb at GameSpot, Topic Puzzle, 2 pages, May 1997.*
"Norse by Norsewest" Game Review by Kelly Rickards on the World Wide Web at GameSpot, Topic Puzzle, 2 pages, Jul. 1997.*

* cited by examiner

*Primary Examiner*—Mark A Sager
(74) *Attorney, Agent, or Firm*—Fish & Richardson P.C.

(57) ABSTRACT

A computer program displays a virtual environment and a character in the virtual environment. The character includes a body and a replaceable head. Player control signals from an input device control replacement of the character's replaceable head and other character actions in the virtual environment. The computer program may attribute play characteristics to the character based on the head in place on the character at a given time. These characteristics may be thematically consistent with the displayed appearance of the head in place. The program may allow a player to select a set of character heads for use with the character. The program may allow the player to collect heads from the virtual environment and store the collected heads for use. The program may offer communication with other connected computer systems facilitating a multi-player or on-line interact hosted game.

19 Claims, 12 Drawing Sheets

COMPUTER GAME WITH REPLACEABLE CHARACTER HEADS

BACKGROUND

This invention relates to interactive computer video games.

SUMMARY

In general, in one aspect, a computer program displays a virtual environment and a character in the virtual environment. The character includes a body and a replaceable head. Player control signals from an input device control replacement of the character's replaceable head and other character actions in the virtual environment.

Implementations may offer one or more of the following features. The computer program may attribute play characteristics to the character based on the head in place on the character at a given time. These characteristics may be thematically consistent with the displayed appearance of the head in place. These characteristics may include, for example, character movement, weaponry, special actions, health, and sound. Character actions may include jumping, fighting, and interacting with objects in the virtual environment. The character may fight enemies in the virtual environment by hitting, throwing, shooting, and initiating area attacks.

The program may allow a player to select a set of character heads for use with the character. The program may allow the player to collect heads from the virtual environment and store the collected heads for use.

The program may facilitate communication with other connected computer systems facilitating a multi-player game or an on-line internet hosted game. A player communicating with a connected system may use character heads supplied by the other system. These heads may have limited lifespans. The play characteristics of these heads may be based on real world events such as the world cup.

The virtual environment may be a three-dimensional virtual environment. The virtual environment may display a collection of themed elements. The virtual environment may offer dynamic links to other virtual environments which may also be created dynamically.

The techniques described here are not limited to any particular hardware or software configuration; they may find applicability in any computing or processing environment that may be used for playing a game. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Advantages include one or more of the following. The computer program described can provide amusement as players strive to amass collections of strange and different heads from the virtual environment.

Other features and advantages will become apparent from the following description, including the drawings, and the claims.

DETAILED DESCRIPTION

Figure 1:
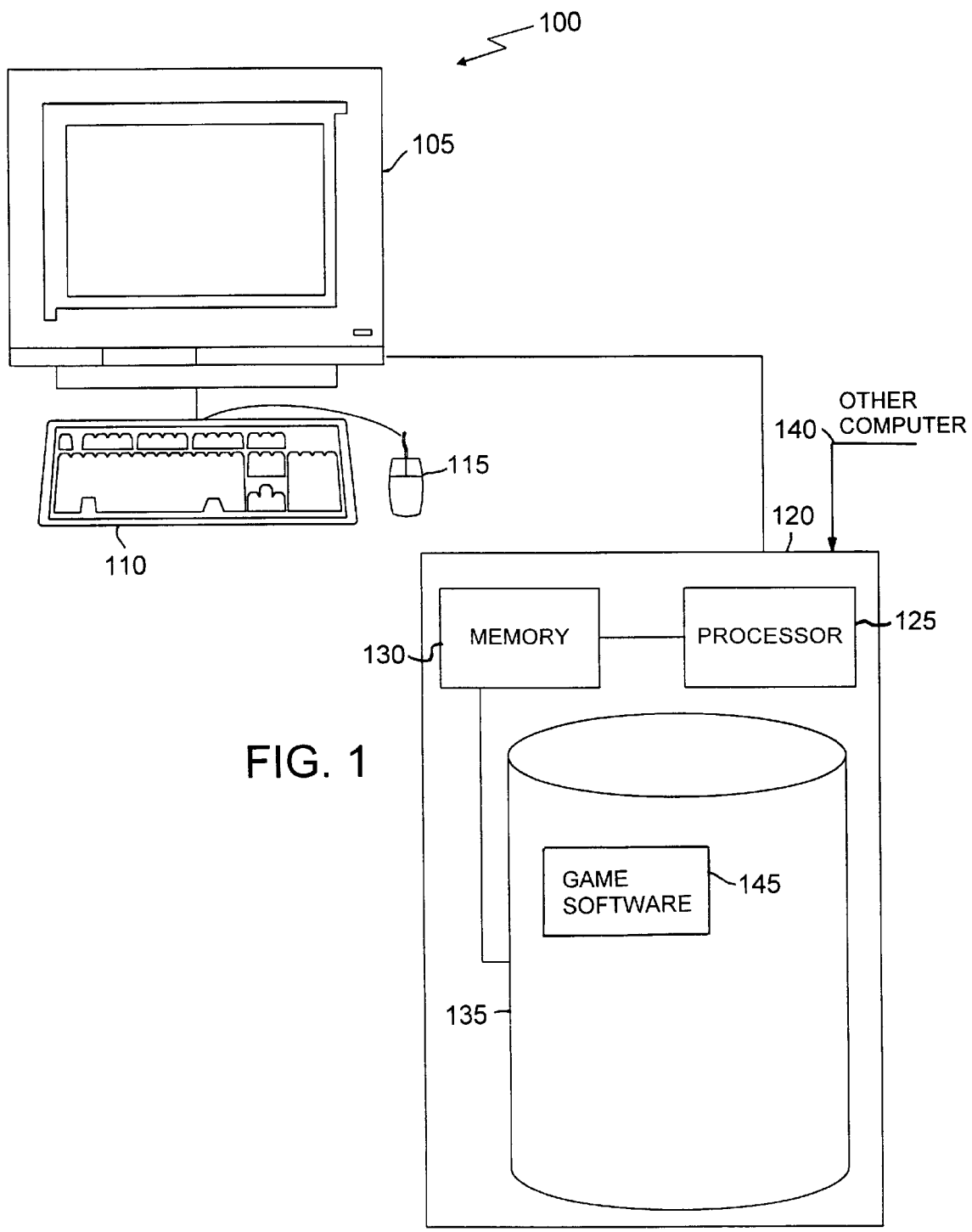
FIG. 1 is a diagram of a computer system platform.

Referring to FIG. 1, a computer system 100 includes a monitor 105, a keyboard 110, a mouse or other pointing device 115 (e.g., a joystick or gamepad), and a digital computer 120, such as a computer including an Intel Pentium™ processor. The digital computer 120 includes a processor 125, memory 130, a mass storage device 135 (e.g., hard drive, floppy disk, or CD ROM), and other customary components such as a memory bus and peripheral bus (not shown). The computer system 125 may also include a graphics accelerator card (not shown) that provides additional graphics memory. The computer system 125 can communicate to other computers via a communications medium such as a cable 140. The mass storage device 135 stores game software 145 that enables a player to use the keyboard 110, mouse 115, or other input device to manipulate graphics shown on monitor 105.

Figure 2A:
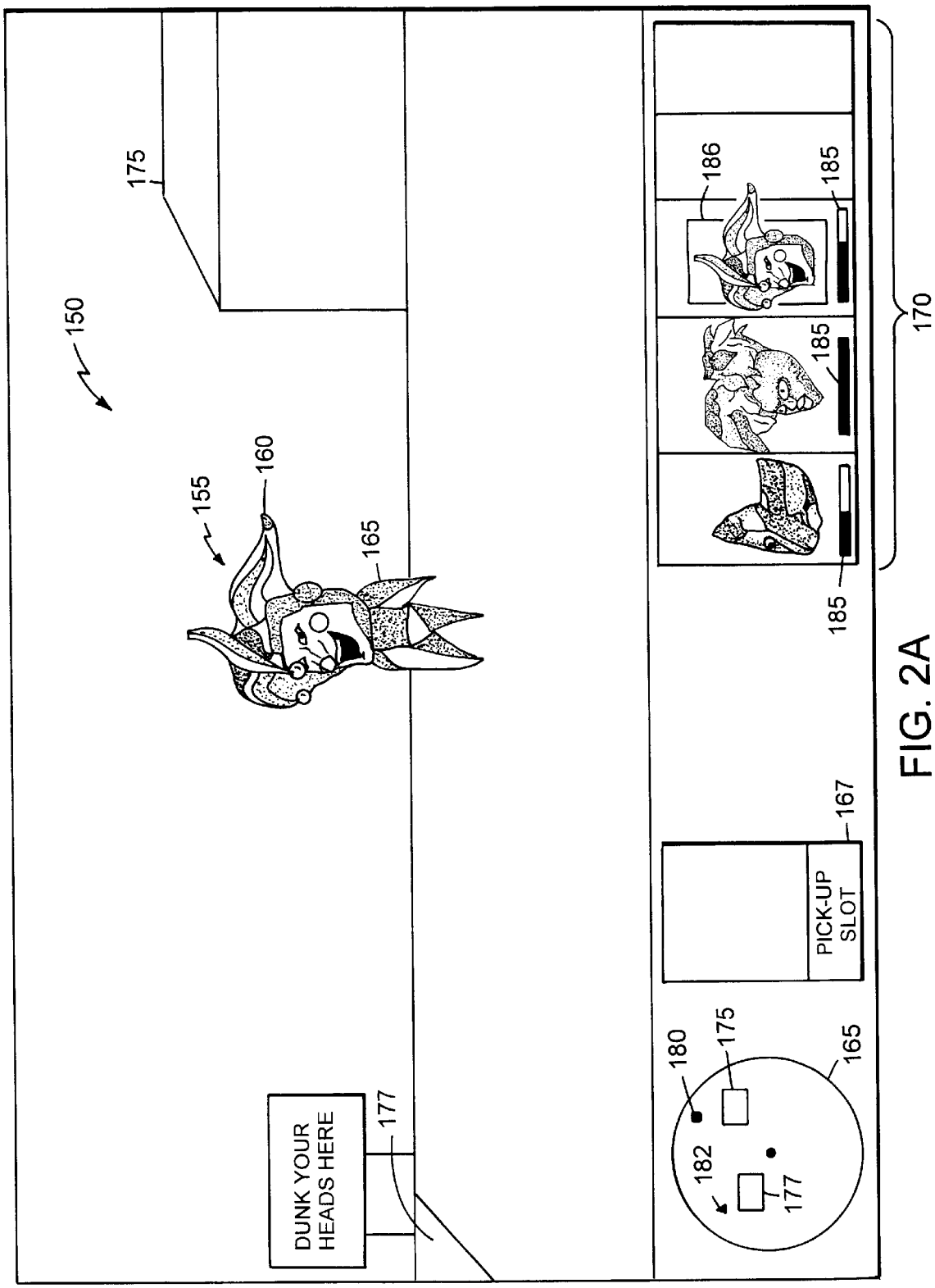
FIGS. 2A–2B are display screens illustrating head replacement.
Figure 2B:
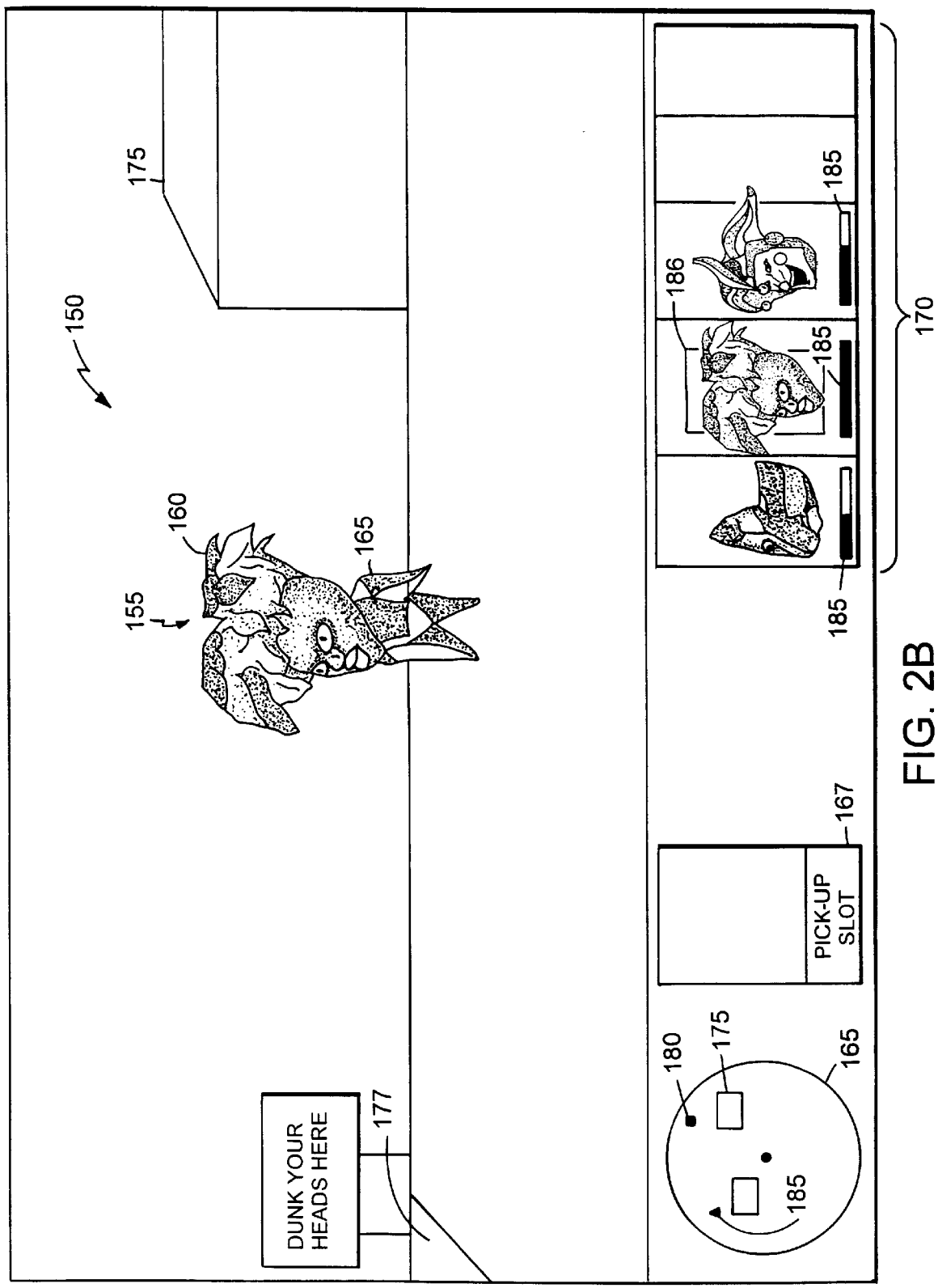

Referring to FIGS. 2A and 2B, the game software 145 uses a variety of computer graphic techniques (e.g., pre-rendered images, texture mapping, polygons, and voxels) to generate a three-dimensional virtual environment 150. In one implementation, the virtual environment 150 displays minimalist rendering and offers simple shapes with heavy black outlines to suggest a futuristic industrial landscape where a single faceless corporation has achieved dominance. Brightly colored sports imagery may be mixed in with the industrial imagery. The bright colors can correspond to a level of achieved skill, similar to belt colors in karate. The virtual environment can also produce sound effects based on activity in the virtual environment such as a sportscasting narrative in any of several different languages.

The game software 145 produces a display on the monitor 105 that includes a perspective view of the virtual environment 150, a character 155 with a generic body 165 and replaceable head 160. The display also includes a head list 170 showing heads that the player can use to replace the character's 155 current head 160. Additionally, the display features a scanner 166 that maps virtual environment 150 objects such as keys 181, disembodied heads 182, enemies 180, and terrain structures 175.

A player can use the keyboard or joystick to control the character 155 within the virtual environment 150. Such controls include the ability to rotate, run forward and backward, strafe, fire, and jump. A player can also change which head 160 appears on the generic body 165 during game play. For example, a player can change from the court jester head 160 of FIG. 2A, to the medusa head 160 of FIG. 2B. Switching a head 160 may also dress the generic body 165 in a different set of clothing (not shown). The game software 145 offers a wide variety of heads, each with a different appearance. The head appearances can be styled to appear like plastic toys. Different heads provided include, for example, a shark head, or a spy in sunglasses.

Each head, such as head 160, offers different play characteristics. For example, different heads 160 can wield different weapons, or can have different characteristics, such as strength or speed. Different heads 160 also produce different sounds and speech. Players can move the characters through ground, air, and water, though different heads have different movement capacities. For example, some heads may jump higher while other heads may navigate more quickly through water. Different terrain can have different properties affecting movement. For example, different terrain may exert different forces of gravity limiting jump height or water may have currents that tug on characters.

The player can replace the currently mounted head 160 with a head from the head list 170. By switching heads 160 and taking advantage of abilities of different heads 160, a player can survive threats posed by the virtual environment 150 and various enemies 180.

A player can also collect heads 160 from the virtual environment to build a collection of heads for use in future head lists. A player can collect a disembodied head 160 by maneuvering the character 155 over the head 160. A backpack stores collected heads, though the backpack may have a predefined storage capacity (e.g., a twenty head maximum). Additionally, a backpack cannot store duplicates of heads. When a player collects a head like one already stored in the backpack, the player is credited with cash based on the health and power of the collected head.

A player can also steal heads from enemy backpacks and other players in a multi-player game. The player can further produce disembodied heads by fighting enemies until the health value of the enemies currently wielded head reaches zero. As can occur to a player's head, upon reaching zero, an enemy head falls from the enemy's body and bounces about the virtual environment (the head may be color coded to indicate its worth). After a period of time, robots carry of uncollected heads. A recently disembodied head continues to have a health value of zero when collected.

The player can transfer heads from the backpack to the head list 170 for use. However, game play continues while the player performs this action. Certain secret combinations of heads in a head list 170 can earn a player cash or special powers (e.g., a President Lincoln head combined with a President Washington head).

Each head 160 possesses a health value 185. Suffering damage from an enemy (i.e., computer controlled characters) or the environment (e.g., falling from a great height) can reduce a head's 160 health value 185. When a head's 160 health value 185 falls to zero, the head 160 falls from the body 165. When this occurs, a head from the head list 170 is automatically positioned atop the body 165 and the player enjoys a few seconds of invulnerability to damage. Additionally, the player can collect the fallen head for storage in the player's backpack and later restoration of health. If the player has lost all heads in the head list 170, the player has a few seconds to transfer heads to the head list 170 from the backpack. If the player fails to do so, the headless body 165 must collect a disembodied head from the environment. In one implementation, the game terminates at this point.

Damage to the head 160 atop the body 165 can also affect the player's store of collected heads in the backpack. For example, if the head falls below 66% health, the player loses a head from the backpack. The player also loses a backpack head if the health of the head 165 atop the body 165 falls below 33% health. Finally, whenever a head 165 falls from the body 165 due to having a health of zero, the player loses yet another head from the backpack. To illustrate, if a head goes from 100% to 0% in one hit, the player loses three backpack heads along with the live head. Similarly, if the head goes from 70% to 20% in one hit, the player loses two heads from the backpack.

Heads slowly recharge their health value during game play, though different heads 160 do so at different rates. Similarly, different heads tolerate damage differently (e.g., some heads can only survive a single injury). Health can also be purchased using cash 181 collected from the environment. The cost of restoring health varies for each head. A head's restoration cost corresponds to its impact in the game. The more useful the head, the more expensive its health. This restricts the use of super-powerful heads. The damage a head can take is independent of the cost of revitalizing the head. That is, a head may be valuable because of a special ability but may require substantial cash to maintain its health. As mentioned, if the head's health falls to zero, the head is lost, although a player can pick up her own character's separated head.

Figure 3:
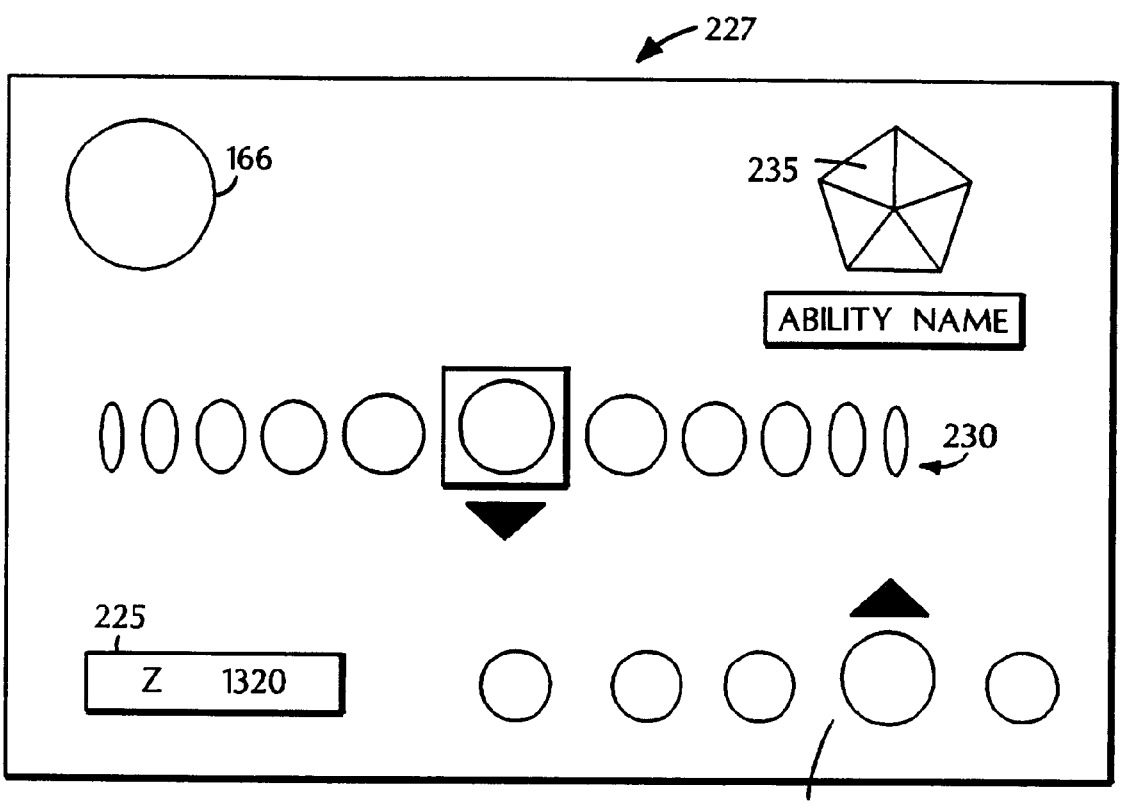
FIG. 3 is a display screen of a backpack interface.

Referring to FIG. 3, a player can bring up a backpack interface 227 during game play. The interface 227 includes a rotatable drum 230 of heads collected from the environment. The player can transfer these heads from the drum 230 to the head list 170 for use in the game. The interface 227 further describes 235 the abilities of heads in the backpack. The interface 227 also shows the amount of cash 225 the player has accumulated to increase the health of damaged heads. Additionally, the interface provides a scanner 166 to give notice of approaching enemies as game play continues during interaction with the backpack interface 227.

Each head in the backpack has zero health. If the player transfers a head from the backpack to the head list, that head's health will be reduced to zero. The cash value of that health is added to the cash total. If the player swaps a head into the current list from the backpack, the head's health is restored to full. The cost of restoration will be subtracted from the player's cash. A swap of a head list head and a backpack head, therefore, has a net result of: cash value of health of list head-cost to recharge health of backpack head.

This result could be positive or negative. The cash total at any one time reflects the result of the current operation on the total cash. That is, the cash total shows what would happen to the player's cash if a transfer were consummated. It does this by applying the cost of operation to the current cash total. If the resulting balance is less than the current balance, the cash numbers 225 turn red, flash, and show the result. If the result is the same, they cash numbers 225 stay green, flash, and show the result. Otherwise, the cash numbers 225 remain a constant green. A player cannot leave the backpack interface 227 with a negative cash balance.

Figure 4A:
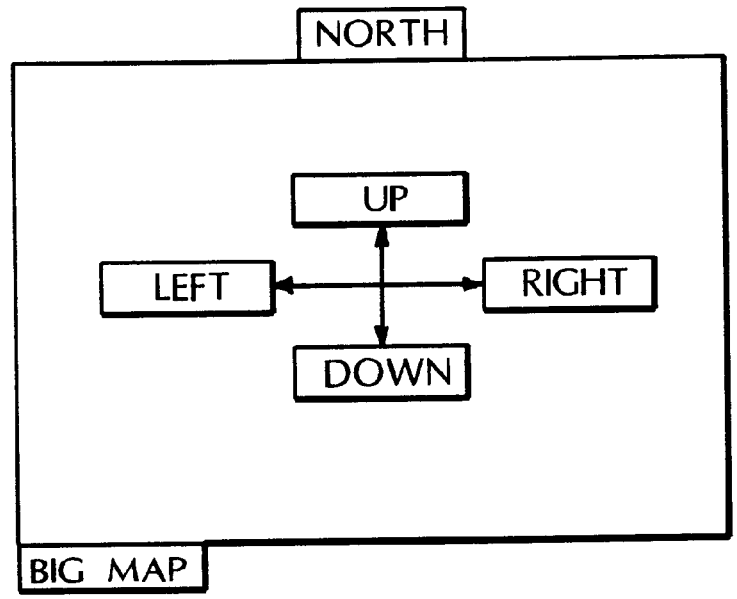
FIGS. 4A and 4B are diagrams illustrating camera controls.
Figure 4B:
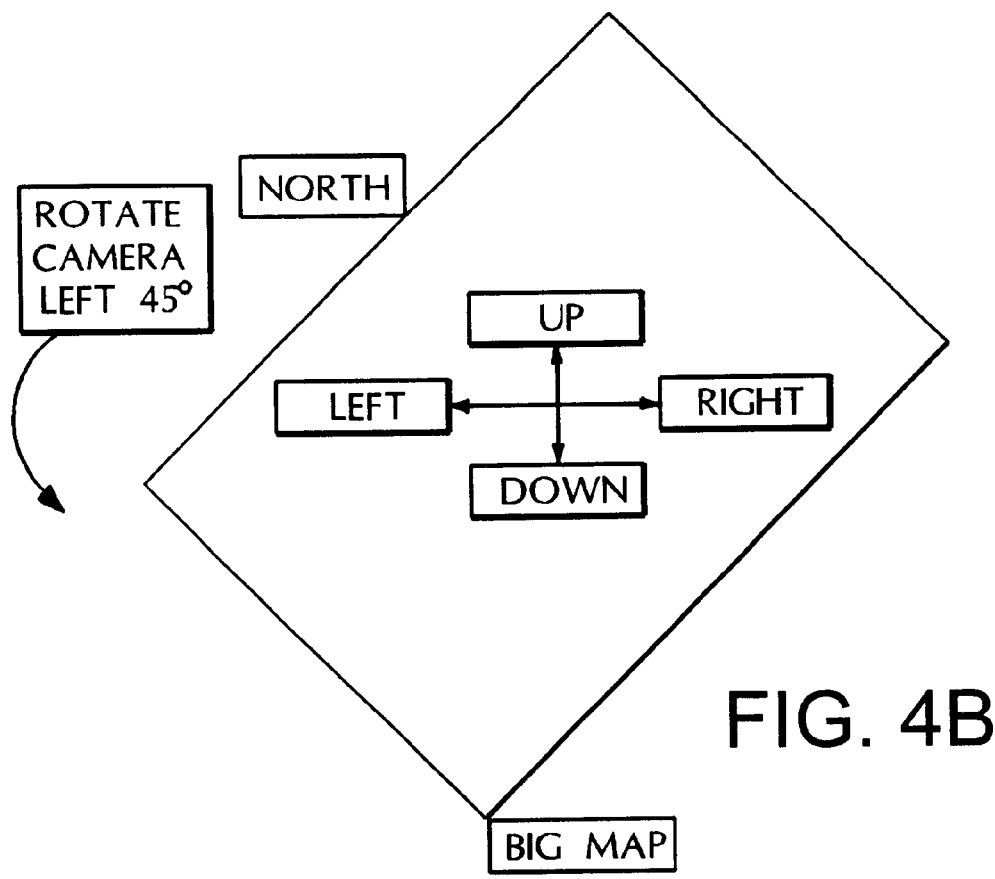

Referring to FIGS. 4A and 4B, a player can control the portion of the virtual environment displayed by maneuvering a camera. Different keys cause the camera to rotate around the player's character in steps of N degrees. Because camera rotation rotates the view on the screen, up, down, left, and right, movements are correspondingly changed.

Figures 5A, 5B:
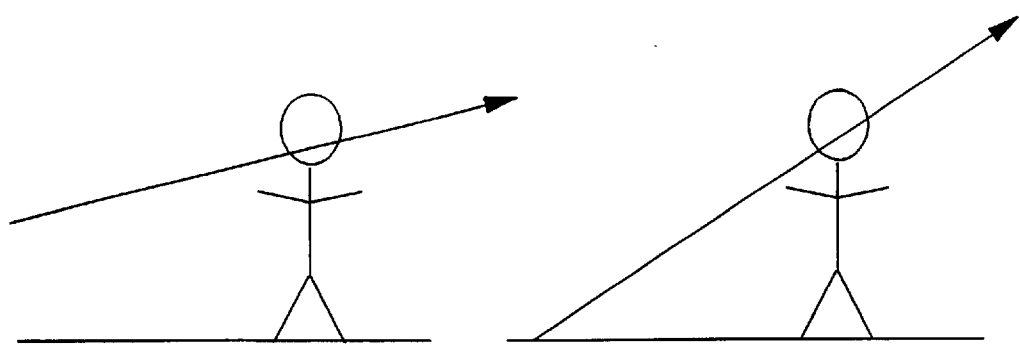
FIG. 5A–5C are diagrams illustrating camera positioning.
Figure 5C:
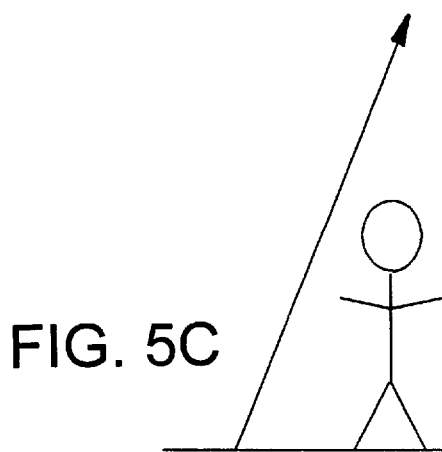

Referring to FIGS. 5A–5C, the player can also cause the camera to "look up." If the camera hits the ground on looking up (FIG. 5B), the center point of camera will move down to let the player look up over the player's head (FIG. 5C). The camera moves back to the default position (FIG. 5A) when the player starts to move.

The camera can also automatically change elevation and zoom level depending on the type of terrain encountered. For example, the camera can zoom-out and up for large scenes, or zoom-in and down for tight scenes (e.g., tunnels). The game software smoothes camera movement using appropriate delay and momentum physics. The game software also provides pre-defined driving game views.

The camera also automatically sets to the optimum position for each head's abilities. For example, the camera is set high for heads that have bomber and floater abilities, is locked behind the plane for planes with guns, lowered to an appropriate level for heads that shoot projectiles, and so on. If the camera is obscured from the player by objects, it will try to find a position at the current distance where it can see the player, and if it cannot it will zoom in to a minimum distance.

Figure 6:
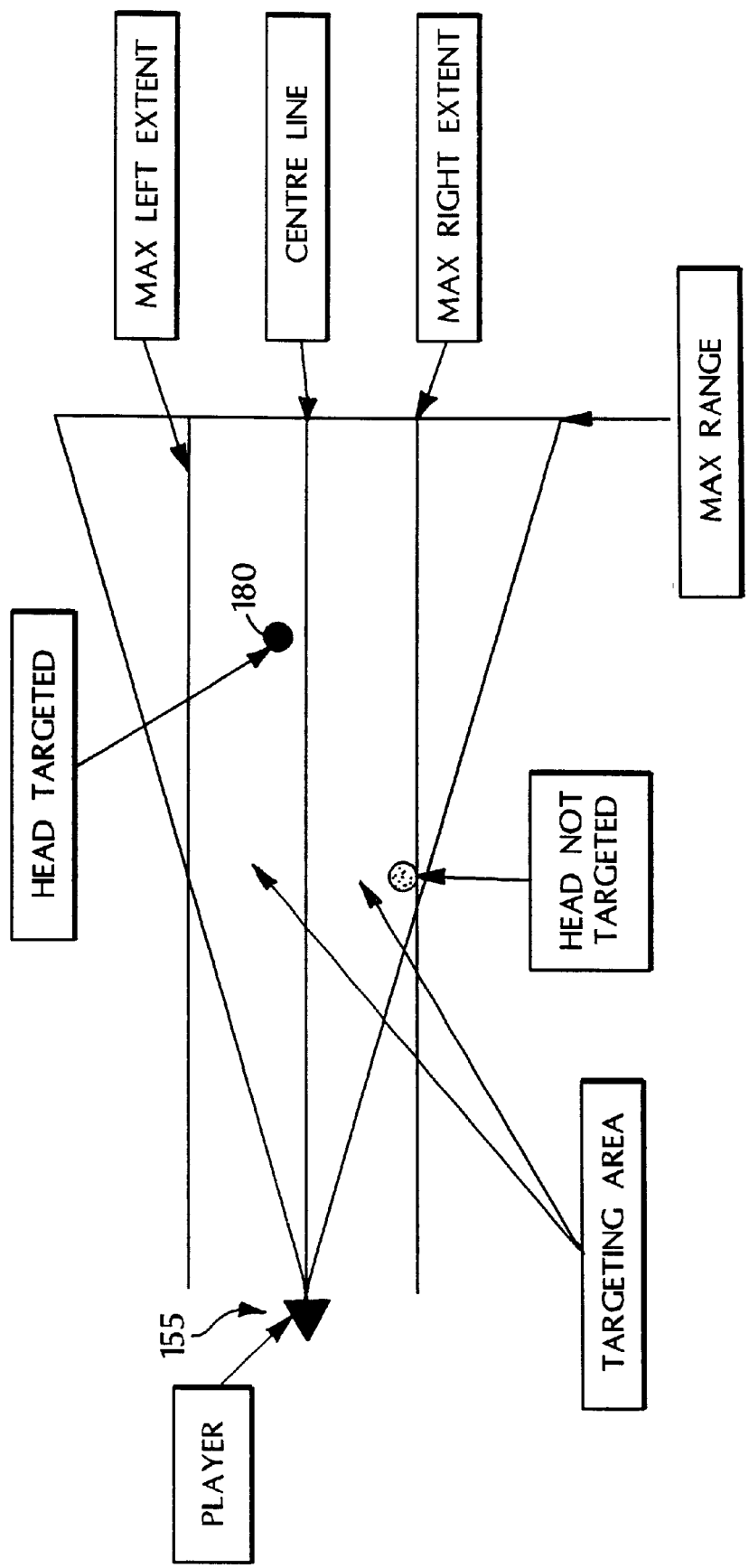
FIG. 6 is a diagram illustrating weapon targeting.

Referring to FIG. 6, there are three types of targeting: standard, camera, and non-line of sight targeting. In standard targeting, the player 155 targets the enemy 180 closest to a line drawn down the center of the player 155. The outer extents of the targeting area is a cone with maximum extents for horizontal and vertical area. The maximum range caps the cone. The entire cone is tilted at the same vertical angle as the camera (i.e., if the camera looks down over a cliff, the cone tilts to look down the cliff as well.) This form of targeting only locks on if the player has a clear line of sight to the target.

Alternately, a player can use camera targeting. This occurs when the player is in first person firing mode, for example when firing an AA Gun (described below). In this case, the game will lock on to any target that lies within supplied cross-hairs. Generally, a player cannot fire at an object that is not in the player's line of sight. The exception to the line of sight rule for targeting is for a "sprouter" (described below) that travels low over terrain. For this ability, a target can be locked on to even when behind a wall or cliff.

In one implementation, each head 160 possesses a single ability. Different heads may share the same ability, but with varying effectiveness. Generally abilities require recharging. Each ability initially starts with a charge of 100 units. If the player uses the ability so often as to reach zero, however, recharging no longer occurs for the ability. The head 165 changes graphically (e.g., dims) to reflect the state of recharging.

The following list briefly describes a few head abilities provided by the game software 145.

Swarm

A swarm of objects (3D points or objects) appears above the player's head. On release, they home towards the current target. Each object released above the player's head consumes one fifth of the recharge value. Hence, a swarm has a maximum of five objects. The swarming objects can timeout. That is, if they fail to reach their target before a period of time, the objects terminate. Additionally, the objects terminate if they run into a wall or a shield.

Parrot

A homing parrot flies or bounces along the ground, homing in on the target until it hits or times out. The parrot bounces off objects. The parrot can be stopped by shielding. Parrots turn slowly enabling the target to out maneuver them.

Homing Missile

A homing missile will homes in on a target until it hits the target, times out, or hits an object. Homing missiles fired from the ground hover close to the ground, following the gradient of the terrain. If the gradient change is too large, the missile will impact on the ground. A target can avoid damage from a homing missile through shielding, teleporting, superspeeding, a buildup jump, or general maneuvering.

Boomerang

A boomerang weakly homes towards a target. If untargeted, it follows a flat curved path away from the player. It terminates when it impacts environment feature. The boomerang will go up slopes if the gradient does not exceed a set level. The target can avoid damage through shielding, teleporting, superspeeding, a buildup jump, or general maneuvering.

Projectile

Projectiles follow a trajectory to the location a target occupied when the projectile was initially fired by a player. Different projectiles exist. Projectile explosions are correspond to the type of projectile. Damage inflicted by the projectile attenuates with the distance traveled by a projectile. The target can avoid damage through shielding, teleporting, superspeeding, a buildup jump, or general maneuvering.

Bouncer

Bouncers follow a trajectory to the location of the target when the bouncer is fired. If a bouncer hits the ground instead of the target, it reacquires that target and follows another trajectory towards the target's current positions. The trajectory adjustment, however, cannot vary above a pre-defined limit. The bouncer can do this for three bounces before timing out. The target can avoid damage through shielding, teleporting, superspeeding, a buildup jump, or general maneuvering.

Flames

Flames feature individual particles shot horizontally in front of the player. Each particle is targeted when fired. Each particle times out after a very short period. The effect is of a stream of hot particles, which can be sprayed across an area. On impact, the display briefly shows fire burning on the target. Flame throwers can generate flame particles that persist longer. The target can avoid damage through shielding, teleporting, superspeeding, a buildup jump, or general maneuvering.

Spray

Spray is similar to flames, except the particles follow a parabolic, projectile-like course. The target can avoid damage through shielding, teleporting, superspeed, buildup jump, or general maneuvering.

Dropped

A dropped attack only comes with flying heads. The camera is set high, so that the player can see the head's shadow. The dropped attack drops weakly homing objects at targets below. When firing, the display may temporarily change to a first person view of the area beneath the head. The target can avoid damage through shielding, teleporting, superspeeding, a buildup jump, or general maneuvering.

AA Gun

When firing an AA Gun, the display changes to a first person display, with cross-hairs in the middle of the display. The player can maneuver the cross-hairs across the display. There is no targeting for AA Guns, instead the player fires directly at the cross hair. Tracers will fly into the air, with explosions at their maximum range if the shots miss the target The player cannot move in when firing the AA Gun. Further, the player can only shoot at targets higher height of the head. The AA Gun may feature "rotating firing". In one implementation the same techniques used for AA Guns can be used a with missile battery.

Laser

A laser shoots a fast moving bolt at a target in front of the player. If untargeted, the laser fires out directly in front of the player. If the laser misses, the laser bounces off of any objects it hits, with a spray of sparks and smoke and will explode on impact with the ground. Lasers will follow the height of the ground unless the gradient exceeds certain amount. Lasers timeout. The target can avoid damage through shielding, teleporting, superspeeding, a buildup jump, or general maneuvering.

Arrows

Arrows fire directly out at a target in front of the player. If untargeted, they fire out in front of the player. Arrows follow the height of the ground unless the gradient exceeds a certain level. Arrows fall to the ground after a set distance. The target can avoid damage through shielding, teleporting, superspeed, buildup jump, or general maneuvering.

Mines

Mines can be laid in the environment to be triggered at a later time. One type of mine is a command mine, where the player lays the mine on a down key, and triggers it on the next up key event. A player can lay a maximum number of mines. Subsequent mine laying causes previously laid mines to disappear in round robin style.

Cell

Cells are fired from the player in the same way as a homing missile. If the cell hits a target, the cell is activated around the target. It stops the target from moving and firing out of the cell (i.e. the player cannot fire weapons such as projectiles, but can teleport, shield, or use an airstrike). The target can still change heads. The target can be hit by other weapons while in a cell, and can still receive damage from damaging surfaces, e.g. lava. If the target is flying, the target falls from the sky. Eventually the cell times out, releasing the target.

Sprouter

The sprouter is fired at the target in the same way as a cell. The sprouter stays close to the ground, and can only hit targets on the ground. When it hits, the target bobs up and down vertically, but cannot otherwise move or rotate. The target can still change heads and fire. Eventually the sprouter times out, releasing the target. The bobbing decreases as the time out time comes closer.

Quake

A quake originates at the player. On firing a quake, the camera shakes and a ball shock wave comes out from the player. The ball dissipates over distance making quakes a short range weapon. Targets within the shock wave are damaged as a function of their distance from the epicenter. Quakes can damage flyers who come within the shock wave. The target can avoid damage through shielding, teleporting, superspeeding, or general maneuvering.

Gun

A Gun fires out tracer bullets at a target in front of the player. If no target exists, the bullets will be fired at the gradient of the terrain the player is standing on. The bullets follow straight lines, and terminate if they hit any object, character, or have traveled a set distance. Tracer bullets will not change gradient or direction after being fired. The target can avoid damage through shielding, teleporting, superspeeding, or general maneuvering.

Medic

On firing a medic ability, the health of the medic is given evenly to heads in the head list. If no heads need health, no health is transferred. The medic ability does not recharge.

Interface

An interface operates like a cell, however, if it hits a target, for a set period, the target constantly changes its head. If the target can increase its distance from the player above a set amount, the effect stops. The target can still fire. Head change is rapid and constant during the attack. The target can avoid damage by teleporting, superspeeding, a buildup jump, or moving out of range.

Shield

When triggered, the shield stops all damage to the player. When hit a shield can re-target a particle back the particle's source.

Damaging Shield

A Damaging Shield acts like a shield, but in addition the player can ram a target and cause damage.

Airstrike

Triggered on key down, the camera moves to top down view, with cross-hairs in the middle of the screen. The player can then move the camera around without moving the character's position. The player has a set period to position the cross-hairs over the target. Key up will release a physical object, which will fall directly down and explode on the ground under the cross hair. A whistling noise gives the target a short period in which to react. If the move times out, bombs drop wherever the camera is currently pointing. After being fired, the camera cuts directly back to the player. Targets can avoid damage by shielding themselves, teleporting, or hiding under objects.

Guided Missile

On being fired, the player can move an appropriate object through the environment using the same controls used for player movement (including jump). As this is happening, a sound effect is played (e.g. a "Jaws"-like theme). When the object runs into a target, an appropriate special effect is played and damage is done to the target. The missile can time out. Targets can avoid damage through shielding, teleporting, and general manoeuvering.

Invisibility

The player becomes invisible. Enemies stop reacting and their weapons cannot lock on to the player. The player has a set period to run around the environment. The player still receives damage if accidentally hit. The effect stops if the player changes heads.

Car

Cars can either be heads in their own right or an ability of a head. Cars are generally faster than other heads, and can cause damage by ramming. If the car travels fast enough, and hits a wall, the car is damaged. Cars cannot strafe, but can jump. Cars can also jump ramps. The player can operate the car into a power slide by holding a left/right key while travelling forward. When a power slide occurs, the car's speed is translated into a rotation about the rear of the car.

Bike

Bikes can be heads in their own right or an ability of another head. Bikes are faster than cars, but otherwise handle in the same way. Bikes do not damage targets they ram, but will be damaged themselves if traveling fast. Bikes cannot strafe, but they can jump.

Plane

Plane can be controlled by Left and Right commands that bank the plane, and Up and Down commands that pull the nose up and down. Planes lose momentum when flying nose-up, and gain momentum when diving. The camera is fixed directly behind a plane if the plane has a gun, and high up if the plane drops bombs. If a plane hits a wall, the plane bounces back by its length without damage. Planes cannot strafe or jump. Planes can also perform loops to avoid incoming fire.

Floater

Floaters are controlled similar to planes. Floaters always move slowly forward. The camera is set high for floaters. Floaters have no momentum, but are bounced back on hitting a wall in the same way as planes. Floaters cannot strafe or jump.

Glider

On pressing a key, the glider flaps slowly, and can be directed like a slow plane. If a glider starts to fall, it moves into a gliding position. If a glider travels nose down, it picks up speed. If it goes nose up, it loses speed. Gliders are restricted on how high and low the nose can go. Gliders slowly lose speed, and will stall (fall) if speed falls beneath a set amount. The player must point the nose down to gain speed and exit the stall. Gliders cannot strafe or jump. The ability to flap slowly recharges.

Boat

Boats can be heads in their own right or an ability of a head. A boat head can move through water faster than normal heads, although a boat moves much more slowly when on land. Boats can jump, but cannot strafe. Boat handling is the same as for cars. That is, boats also can power slide. One type of boat offers the graphics of a hovercraft.

Big Jump (Buildup Jump)

As soon as the key is pressed, the player is forced up. On releasing the key, or on the recharge running out, the player comes down under the usual game physics, continues along the trajectory of the jump, and eventually falls to earth without being damaged.

Teleport

Teleport moves the player instantly from one position to another, with an appropriate special effect and audio cue. There are two ways of choosing the destination. The first puts the player directly behind a targeted head. If no target exists, the player teleports a short distance straight ahead. The second uses cross hairs to enable the player to specify a destination. On timeout or on releasing the fire button, the player teleports to the position of the cross hairs. There is a maximum increase in height teleporting can produce. Thus, a player cannot teleport to the top of a building. There is no maximum decrease in height.

Superspeed

The player's moving speed is substantially increased, however, player continues speeding until the effect times out.

Far Sight

"Far Sight" uses a similar control mechanism as an Airstrike. On key down, the camera moves to overhead view, with the silhouette of a pair of binoculars over the screen. The player can move around in this view until key up or until timeout. The height of the camera is a set height above the terrain, but is restricted by a ceiling from moving over mountains which are too large.

In another implementation, each head 160 offers different normal and special actions. The player can control which action occurs by toggling the action with a keyboard key or mouse button. Both normal and special actions may require a recharge time before the same action can be taken again. This prevents a player from using an ultra-powerful weapon over and over.

Normal actions give heads 160 the basic ability to survive in the virtual environment 150 (e.g., a simple weapon of unlimited use). Special actions have much more humor, panache, and deadly effect on enemies in the virtual environment 150. For example, an air force general head 160 can call in an airstrike. Other special actions have less immediate effects, such as the ability to lay land mines or booby traps that only have effect when triggered or after some time delay.

The game software 145 handles both normal and special actions with general routines that support hitting, throwing, projectile attacks, and area attacks. Successful attacks inflict damage on enemy heads 160. All attacks other than area attacks occur in the direction the player is facing. A graphics cue always indicates when a target takes damage.

Hitting inflicts minor damage. Hitting includes both lunging and simply running into an enemy.

Throwing objects, such as hammers, arrows, buckets of water, lightning bolts, grenades, and other objects thematically consistent with a particular head 160 (e.g., a clown may throw juggling pins) can cause greater damage. Throwing, generally, can only affect on-screen enemies. The game software 145 animates thrown objects.

Projectile attacks, such as firing weapons or magic wand zaps that morph other heads 160 into frogs, also affect on-screen enemies. The game software does not provide graphic cues of such attacks, only the results, producing the impression of very fast projectiles and saving processor resources for other tasks.

Area attacks, such as hail stones and mortar attacks, fill an entire play area including off-screen play areas. Different heads 160 offer different area attacks. For example, a cowboy head may have the ability to initiate a cattle stampede.

Other special actions include the ability to morph from a head into a special object such as a vehicle. Vehicles include cars, boats, and bikes that move quickly over land or water. Vehicles act as players might predict. For example, a helicopter enables a player to hover in mid-air. A player can move a vehicle into enemies and other players to cause damage based on vehicle speed. If the player, however, rams too forcefully, the vehicle/head itself may suffer damage.

Figure 7:
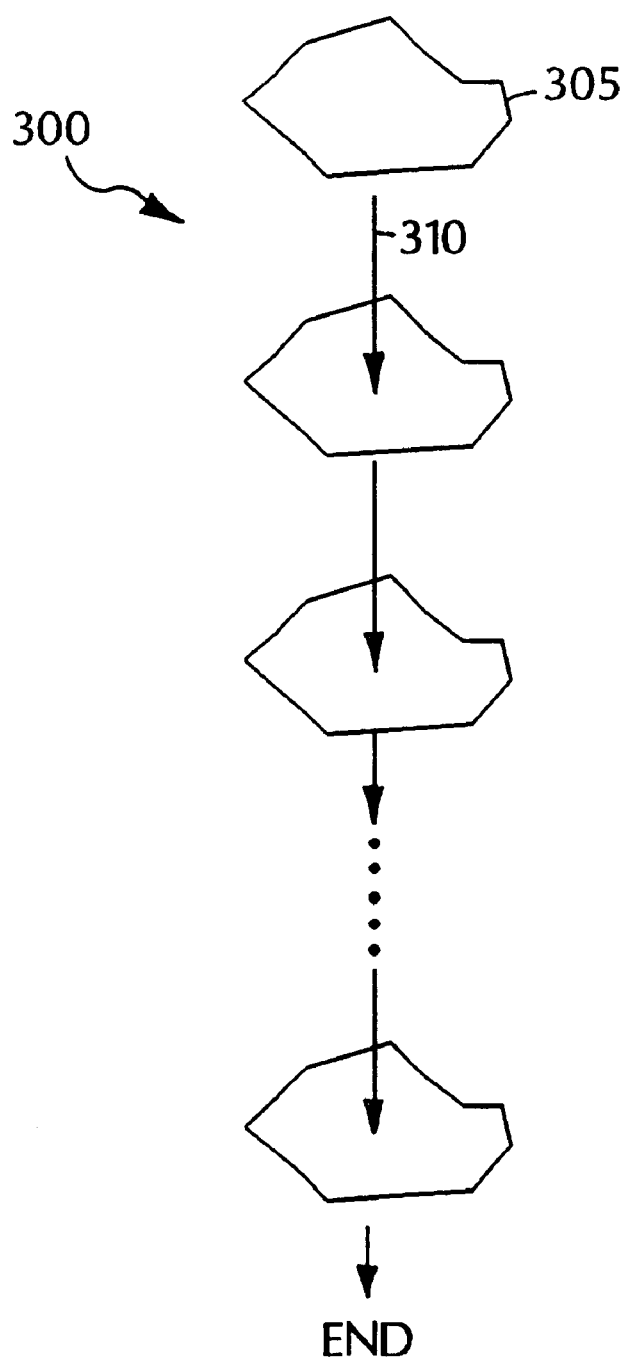
FIG. 7 is a diagram of a linear progression of asteroids.

Referring to FIG. 7, the game universe 300 includes asteroids 305, each of which potentially offers a different virtual environment. Different asteroids 305 include differently themed objects and musical scores. Different themes include sport, industry, war, Hollywood, city, car, science, theme park, occult, hell, and generic alien landscapes. Though these differently themed asteroids include different objects, the asteroids generally feature wide open spaces to allow players to freely move about. Some asteroids 305 may include puzzles that offer cash awards for their solution.

Gates 310 link asteroids. Gates 310 appear to the player on or above an asteroid surface. Traveling through a gate 310 transports the player to a linked asteroid 305. Gate 310 color can indicate the ferocity of action awaiting a player on the linked asteroid 305. Prior to appearing on an asteroid 305, a player can choose the heads in the player's head list that the player will use in the asteroid 305. This enables a player to scout an asteroid 305, then return with a tailored set of heads.

In one implementation, progression through different asteroids is linear. That is, a player must finish each asteroid one after another. In this implementation, each asteroid has one entrance and exit gate. The exit gate only appears when the player collects keys from the environment (e.g., by eliminating enemies that carry keys). One such progression of asteroids includes: (1) a valley, (2) a shopping mall, (3) an industrial warehouse, (4) sandcastles, (5) an airstrip, (6) a car chase, (7) war trenches, (8) an occult mansion, (9) a molecule, (10) a pool, (11) "Zulu dawn", (12) an industrial production site, (13) "Classic", (14) an industrial machine, (15) an occult castle, (16) an AA gauntlet, (17) venice (a city of waterways), (18) a jungle war base, (19) a matrix, (20) hell, and (21) an ending dogfight. Some of the above levels require a player to accomplish a task within a predetermined time period.

Figure 8:
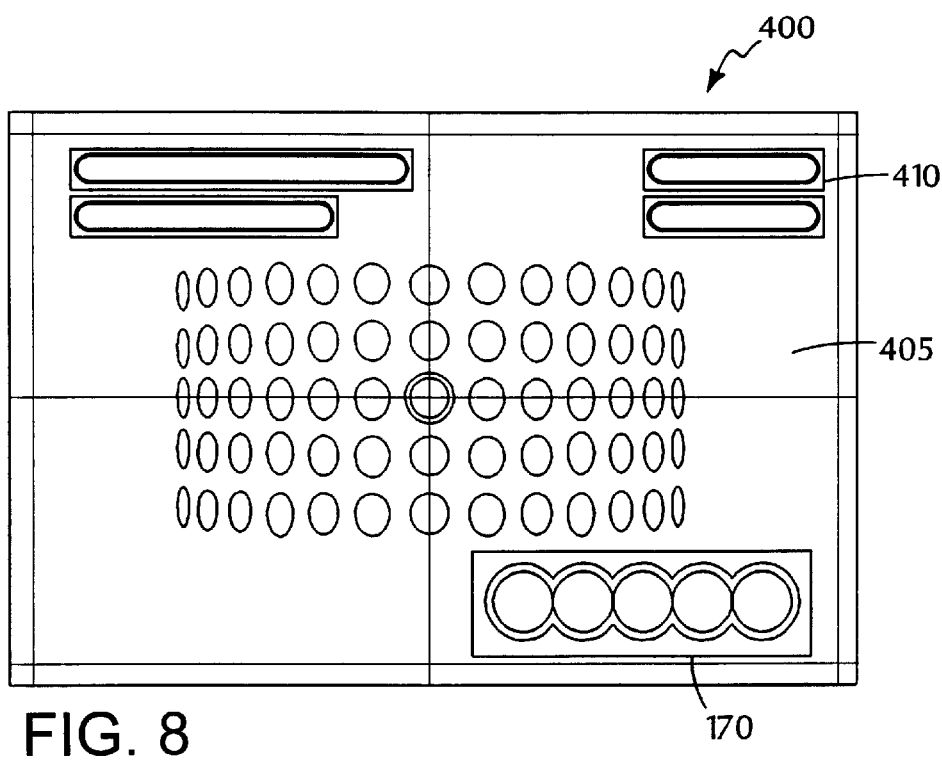
FIG. 8 is a display screen of a player's head collection.

Referring to FIG. 8, before entering a level a player selects one to five heads from a head case screen 400 for the player's head list 170. A head drum 405 provides a revolving display of the player's head collection and information about the abilities of each head. Arrow controls 410 rotate the head drum. After selecting heads for the head list 170, the player receives a level briefing describing different enemies and features of the upcoming asteroid.

A player completes a level by exiting an asteroid via an exit gate. A player can pause and save a game at any time to resume play later. After completing a level, heads collected in the player's backpack are transferred to the player's head collection. A player can replay a completed level, however, the results do not effect the player's score and any heads collected are not added to the player's collection. A player's score at any time includes cash that the player has accumulated and the value of the player's head collection.

Figure 9A:
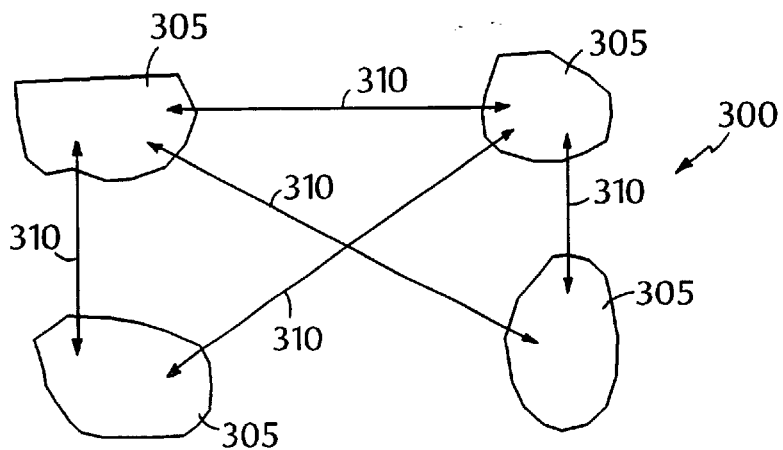
FIGS. 9A–9C are diagrams illustrating asteroid connections.
Figure 9B:
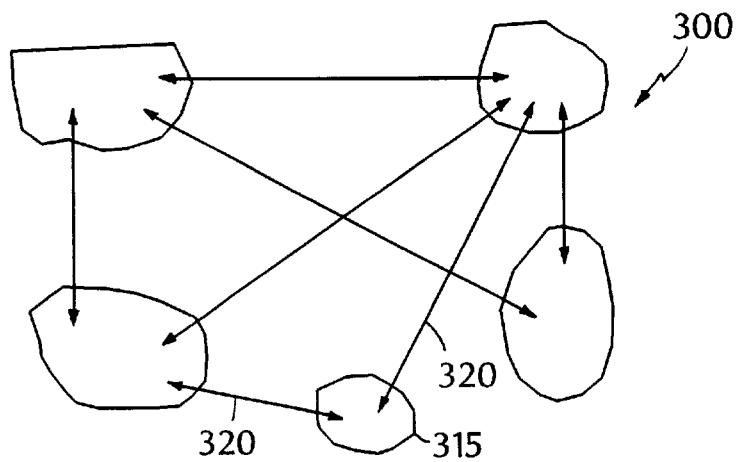
Figure 9C:
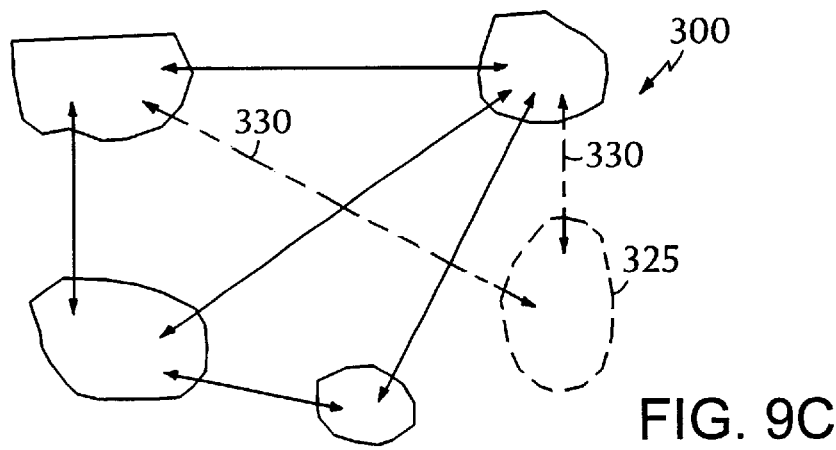

Referring to FIGS. 9A–9C, another implementation requires linear travel through asteroids. In this implementation, gates 310 do not exist indefinitely, but are both created and destroyed. Gates 310 briefly flash to inform a player of either event. Some gates 310 have special properties, for example, some gates 310 only permit travel in one direction. Other gates 310 move quickly across an asteroid surface.

The game software can both create (FIG. 9B) and destroy (FIG. 9C) asteroids during game play (e.g., when no heads occupy an asteroid). Creating an asteroid 315 (FIG. 9B) also produces corresponding gates 320 linking the asteroid 315 to pre-existing asteroids. Destroying an asteroid 325 (FIG. 9C) destroys gate 330 links that connected the destroyed asteroid 325 with other asteroids. As the player collects key heads, indicating a certain level of proficiency, the game software creates new asteroids and provides linking gates 310 (FIG. 7B).

Figure 10:
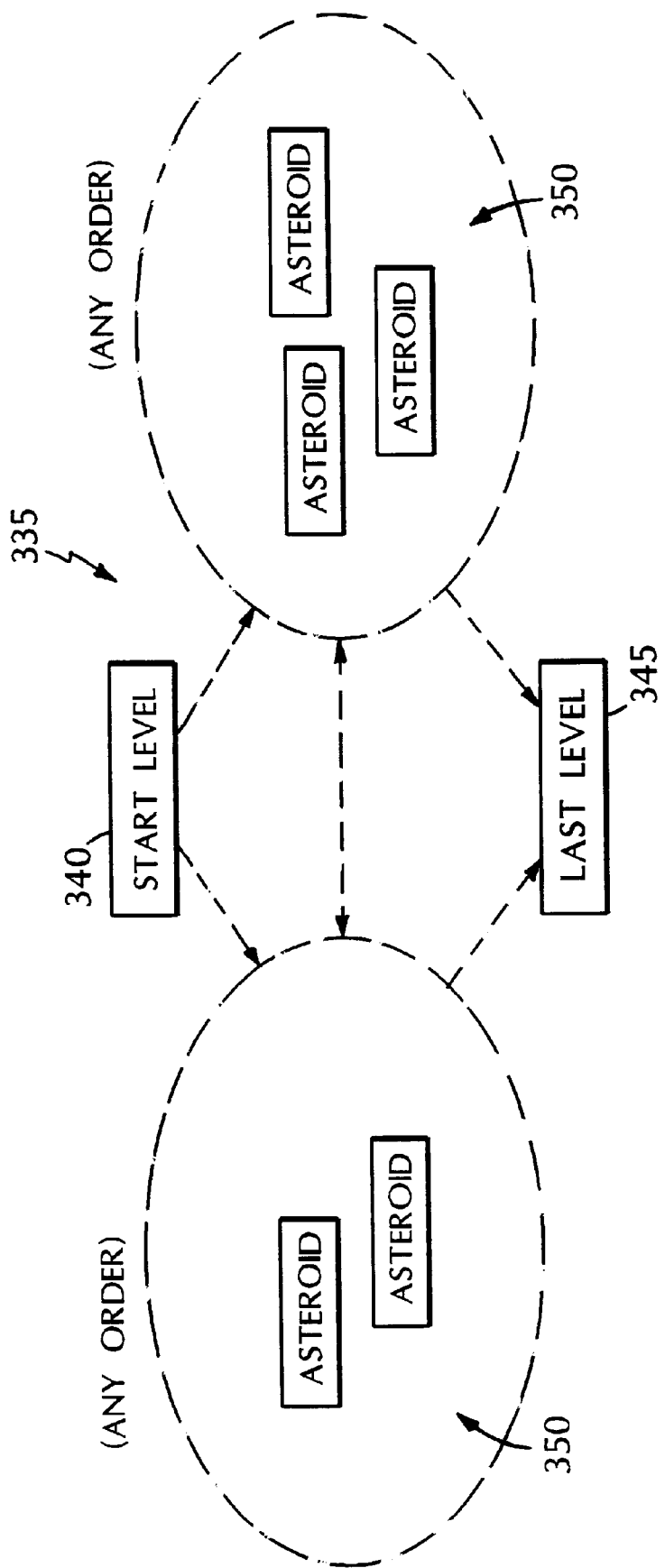
FIG. 10 is a diagram of a set of asteroids corresponding to a particular level.

Referring to FIG. 10, in a single player game, the game software groups asteroids into sessions 335. The skill level required to complete the asteroids in a session 335 increases as the game progresses. An initial level is defined by a start asteroid 340 of a given difficulty and an end asteroid of a greater difficulty 345. Other session asteroids 350 offer difficulties, generally, between the difficulties of the start 340 and end 345 asteroids. The player can visit asteroids between the start and end asteroid in any order the player chooses.

Some sessions offer "hidden" asteroids. These hard to get to asteroids (e.g., their linking gates only appear after certain pre-defined events such as solving a puzzle or killing a particularly strong enemy) usually have strange heads or dense concentrations of cash or health power-ups. The game also provides training asteroids for new players. These asteroids can offer players instructions and feedback that illustrates game controls.

Figure 11:
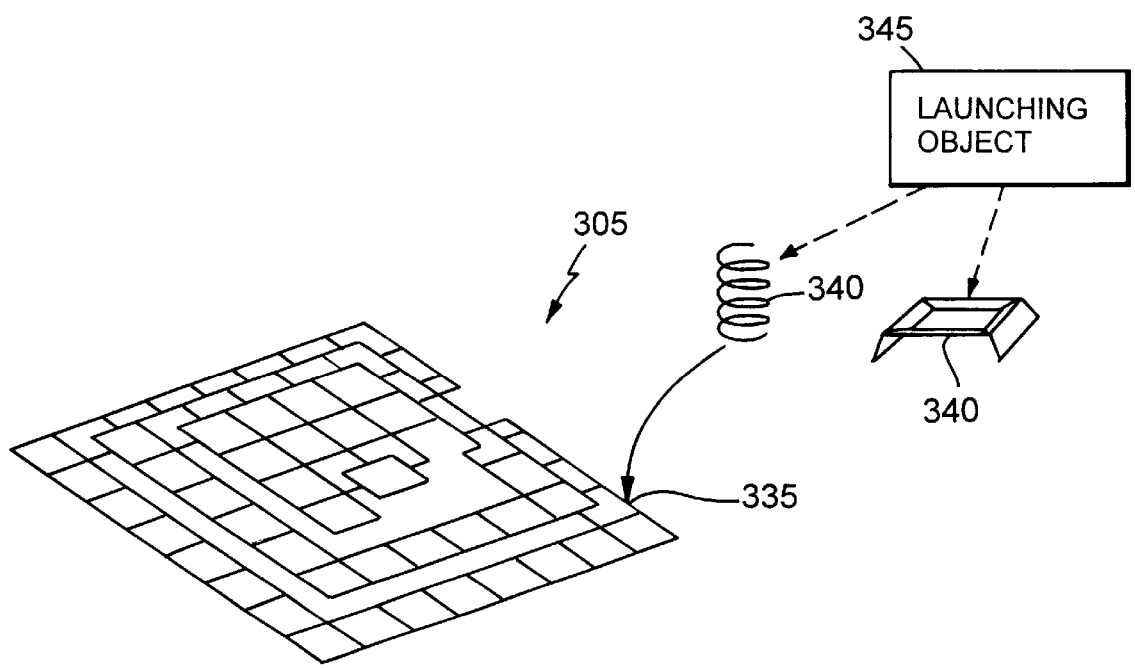
FIG. 11 is a diagram of asteroid components.

Referring to FIG. 11, two building blocks form asteroid terrain: platforms 335 and objects 340 that rest on or above platforms 335. Platforms 335 are ground textures which have a certain height above absolute ground zero. Platforms 335 form the ground that supports a player. While on the ground, movement automatically moves the player up platforms 335 of different levels. Platforms 335 are built from polygons and can be tilted to form an undulating plane. Any gaps produced in this way are filled by polygons. This technique can produce a cliff, for example, by raising up an entire area. A player can destroy ground, producing perilous holes.

Asteroid platforms 305 wrap-around, preventing a character from walking off the edge of an asteroid. When displaying platforms 305 during game play, the game software displays the platforms as sloping away from the player in every direction, giving the feeling of a close horizon. This enhances the appearance of maneuvering about a small asteroid and saves the game software from having to handle on-screen clipping planes.

The game software provides a number of different generic objects 345 with different generic properties for placement on platforms 335. However, the same generic object 345 can appear in various map object guises 340. For example, a generic launching object 345 may appear as a trampoline map object in a circus themed asteroid, but as a coiled spring map object in an industry themed asteroid.

The game software provides both major and minor objects. A player cannot move major objects, for example, the Empire State Building. However, some heads (e.g., a Hercules head) possess the strength to move minor objects (e.g., small boulders on a lunar themed asteroid).

Objects usually appear clumped together. Yellow and black stripes often demarcate clumps of objects. Regardless of a particular asteroid theme, areas outside the object clumps take on a default alien appearance.

Platforms 335 can have different terrain characteristics. For example, some terrain impedes player movement with "stickiness" while other terrain may be "bouncy." Some terrain can even emit particles that exert a force. These particles have a lifespan, a vector direction, and carry a varying force. Other terrain can dynamically alter its appearance and properties.

The game software 145 populates asteroids with enemies. Some enemies, controlled by game software AI (artificial intelligence), have their own personality and tactics, and carry their own complement of heads. Enemies can have heads from the pool of heads from which a player chooses or may have different enemy heads. The game software also controls less sophisticated enemies, which essentially, are creature shaped minor objects.

The game software also populates asteroids with various health power ups that recharge the health value of a character's head and different heads with different health values. Some asteroids also offer cash power ups that add to a player's wealth.

Figure 12:
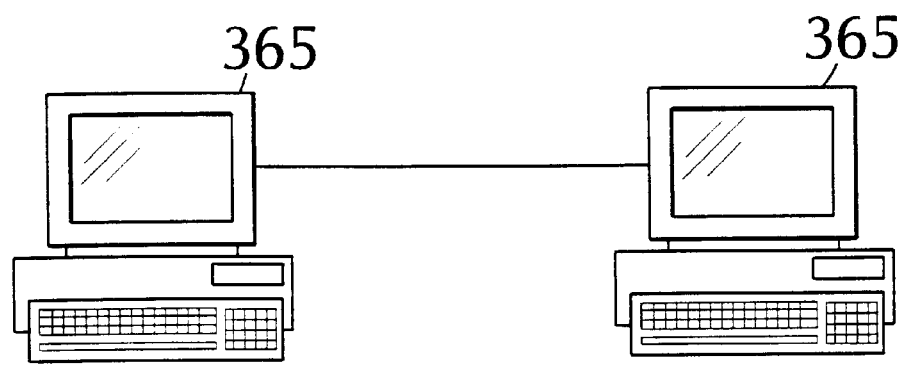
FIG. 12 is a diagram illustrating multi-player a game.

Referring to FIG. 12, in addition to the single player game described, the game software offers a multi-player game where connected computer systems 365 can place different players in the same virtual environment to facilitate either team work or duels. Before entering a multi-player game, game software randomly assigns each player a set of roughly equivalent heads. These heads can be from a special set of multi-player game heads. Only by capturing these heads in the multi-player game can a player add these heads to a collection.

Players can compete to see who collects the most heads. The game software fosters this competition with a variety of rules. For example, after a head has fallen from a body, for a short period of time, only the player who inflicted the final blow can collect the head. A graphic cue can indicate this period. After this period, the player loses the advantage and any player can collect the head.

After a player has deposited a collected head and collected cash and points for doing so, the game software places a head of roughly similar value to the deposited head in the virtual environment. This keeps the number of heads in the virtual environment constant.

Unlike certain implementations of the single player game, in the multiplayer game, players cannot only collect live heads in the virtual environment, but also immediately put them to use if the player has a free head list slot, perhaps from losing a head. Players can enter or leave a game by finding an exit gate, at any time, however, a player who exits and reenters loses valuable head gathering time.

Another multi-player game pits players against each other in a "tug-of-war". Each player is initially allocated five heads that have a similar total power level. The players then play tug-of-war style to grab all the heads from the other players. For example, if two players begin with five heads and one player loses a head, the other player can collect the head and have six heads to the other player's four. In this game, cash power-ups regenerate to enable player's to use the collected heads. The game continues until a single player has collected all heads.

Some multi-player games take place in an arena of connected asteroids. The area can expand or collapse based on the number of players. The duration of the multi-player game is player defined. For example, players can play until someone reaches a pre-defined limit of points. Alternately, players can specify a time period after which a game ending exit gate appears that terminates play after any player enters. After play terminates, the game software tallies scores, announces winners, and gives players performance grades (akin to belt colors in karate).

Figure 13:
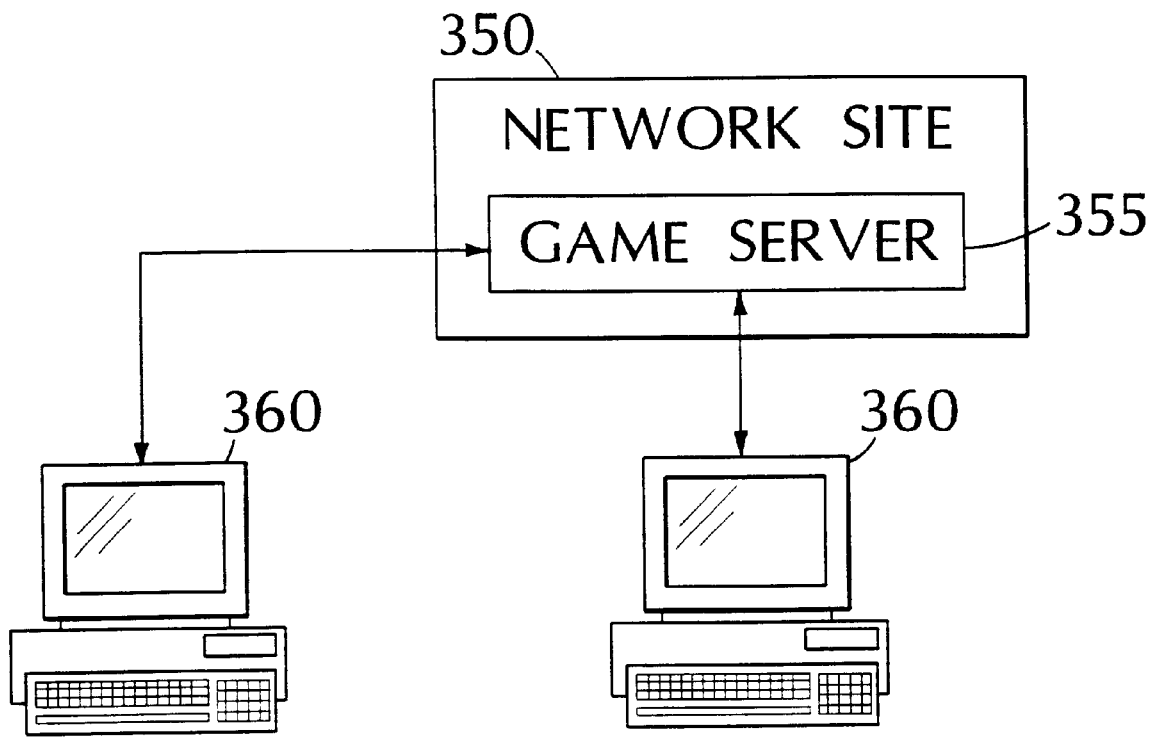
FIG. 13 is a diagram illustrating a network multi-player game.

Referring to FIG. 13, the game software also provides an on-line game that facilitates play over a public network (e.g., the internet). A network site 350 includes game server 355 software that handles different players 365 accessing the site 350.

Each on-line game player seeks to amass a large head collection. A network site 350 can provide new heads for player use and collection. A network site 350 centrally stores game state information (i.e., on-line player locations, their virtual environments, links between asteroids, etc.). On-line games can be continual with different players entering and leaving.

On-line games offer special gaming capabilities. For example, different groups of heads can be made available to correspond with real world events. For example, a group of different country soccer heads could be released prior to the world cup giving purchasers a soccer head with special actions such as exploding soccer balls. These heads could have a limited lifespan, such as the duration of the world cup. Further, different head capabilities could vary based on real world events. That is, a soccer head for a particular country could become more powerful or accurate, based on the performance of a particular country's world cup soccer team.

All game versions offer a complete gaming experience. For example, game software immerses the player in a virtual environment immediately, placing the player in a virtual mall after a pre-rendered introduction sequence. The virtual mall includes escalators, animated janitors mopping virtual mall floors, and different characters game heads going about their business. The virtual mall acts as a front end, replacing the usual text based menu system of many games. The player can operate the game (i.e., selecting the number of players, game options, virtual environments, returning to a saved game, etc.) by walking about the virtual mall and interacting with different objects. The virtual mall features an "elevator music" score.

One area of the virtual mall displays the collection of heads that the player has amassed during game play. A player can sort heads in the collection by different properties (e.g., those with the highest health ratings or those most frequently used). A player can also create named groups of head to ease selecting a head list prior to game play. The on-line game offers extensions to the virtual mall such as a hall of fame, trading area for players to trade heads, and a library of game tactics.

A player can start a game by walking down a corridor labeled "Player Game Arena." The front end quickly and seamlessly gives way to fast paced video game play. Similarly, when a player walks through one of the many exit gates during game play, a player reappears in the virtual mall.

Other embodiments are within the scope of the following claims.

What is claimed is:

1. A computer program, residing on a computer readable medium, for a computer system comprising a processor, an input device that receives player control signals, and a display, the computer program comprising instructions for allowing play of a game by causing the processor to perform the following operations:
   cause the display to display a virtual environment;
   cause the display to display a character in the virtual environment, the character including a body and a replaceable head; and
   process player control signals that control replacement of the character's replaceable head and other character actions in the virtual environment without replacing the character's body.

2. The computer program of claim 1, wherein the instructions cause the processor to attribute play characteristics to the character based on the head in place on the character at a given time.

3. The computer program of claim 2, wherein the instructions that cause the processor to attribute play characteristics to a character cause the processor to attribute play characteristics thematically consistent with the displayed appearance of the head in place.

4. The computer program of claim 2, wherein the instructions that cause the processor to attribute play characteristics to a character cause the processor to attribute play characteristics that include at least one of the following: character movement, weaponry, special actions, health, or sound.

5. The computer program of claim 1, wherein the instructions further comprise instructions that process player control signals that select a set of character heads to be used with the character.

6. The computer program of claim 1, wherein the instructions that cause the processor to process player control signals that control character actions comprise instructions that cause the processor to process player control signals that collect heads from the virtual environment.

7. The computer program of claim 1, wherein the instructions further comprise instructions that cause the processor to store collected heads for future player use.

8. The computer program of claim 1, further comprising instructions that facilitate communication with other connected computer systems.

9. The computer program of claim 8, wherein the instructions that facilitate communication with other connected computer systems comprise instructions that facilitate a multi-player game.

10. The computer program of claim 8, wherein the instructions that facilitate communication with other connected computer systems comprise instructions that facilitate an on-line game.

11. The computer program of claim 10, wherein the instructions that facilitate an on-line game comprise instructions that facilitate a game hosted by an internet site.

12. The computer program of claim 10, wherein the instructions that facilitate an on-line game comprise instructions that facilitate use of different character heads supplied by a connected computer system.

13. The computer program of claim 12, wherein the instructions that facilitate use of different character heads comprise instructions that limit the lifespans of the different character heads.

14. The computer program of claim 12, wherein the instructions that facilitate use of different character heads comprise instructions that alter play characteristics of the heads based on real world events.

15. The computer program of claim 14, wherein the real world events comprise world cup soccer games.

16. The computer program of claim 1, wherein the instructions that cause the display to display the virtual environment comprise instructions that cause the display to display a three-dimensional virtual environment.

17. The computer program of claim 1, wherein the instructions that cause the display to display the virtual environment comprise instructions that cause the display to display a collection of themed elements.

18. The computer program of claim 1, further comprising instructions that cause the processor to dynamically link the virtual environment to other virtual environments.

19. The computer program of claim 1, further comprising instructions that dynamically create the virtual environment.

* * * * *